US011486715B2

(12) United States Patent
 Takahashi

(10) Patent No.: US 11,486,715 B2
(45) Date of Patent: Nov. 1, 2022

(54) INFORMATION PROCESSING APPARATUS, INFORMATION PROCESSING METHOD, AND PROGRAM

(71) Applicant: STROLY INC., Kyoto (JP)

(72) Inventor: Toru Takahashi, Kyoto (JP)

(73) Assignee: STROLY INC., Kyoto (JP)

( * ) Notice: Subject to any disclaimer, the term of this patent is extended or adjusted under 35 U.S.C. 154(b) by 215 days.

(21) Appl. No.: 16/765,544

(22) PCT Filed: Nov. 30, 2017

(86) PCT No.: PCT/JP2017/042950
§ 371 (c)(1),
(2) Date: May 20, 2020

(87) PCT Pub. No.: WO2019/106775
PCT Pub. Date: Jun. 6, 2019

(65) Prior Publication Data
US 2020/0309539 A1 Oct. 1, 2020

(51) Int. Cl.
*G01C 21/32* (2006.01)
*G01C 21/36* (2006.01)
*G06Q 30/02* (2012.01)

(52) U.S. Cl.
CPC ......... *G01C 21/32* (2013.01); *G01C 21/3697* (2013.01); *G06Q 30/0273* (2013.01)

(58) Field of Classification Search
CPC .... G01C 21/32; G01C 21/3697; G01C 21/20; G06Q 30/0273; G06Q 30/0251; G09B 29/00; H04W 4/021
See application file for complete search history.

(56) References Cited

U.S. PATENT DOCUMENTS 8,032,297 B2 * 10/2011 Jakobson ........... G01C 21/3682
340/995.14
2006/0200384 A1 * 9/2006 Arutunian .............. G06Q 30/02
705/14.69
(Continued)

FOREIGN PATENT DOCUMENTS

JP    2004-021539 A    1/2004
JP    2011-154172 A    8/2011
(Continued)

OTHER PUBLICATIONS

English Translation of JP 2017-10038A.*
(Continued)

*Primary Examiner* — Rami Khatib
(74) *Attorney, Agent, or Firm* — McDermott Will & Emery LLP

(57) ABSTRACT

In order to address a conventional problem that it is not possible to provide a user with map expression data whose display mode has been changed according to additional information, an information processing apparatus includes: a map expression data storage unit in which one or more pieces of map expression data expressing a map are stored, the data being associated with one or more attribute values containing region specifying information for specifying a region that is being expressed; an additional information storage unit in which additional information, which is information that is additional, is stored in association with the map expression data; and a transmitting unit that transmits map expression data to a terminal apparatus such that even same map expression data is displayed on the terminal apparatus in a different mode according to the additional information.

13 Claims, 16 Drawing Sheets

(56) References Cited

U.S. PATENT DOCUMENTS

| | | | |
|---|---|---|---|
| 2013/0339891 A1 | 12/2013 | Blumenberg et al. | |
| 2018/0342058 A1* | 11/2018 | Madabhushi | G01T 1/1611 |
| 2019/0162547 A1* | 5/2019 | Ootsuji | G01C 21/3415 |
| 2019/0316931 A1* | 10/2019 | Bailiang | G01C 21/32 |
| 2020/0208996 A1* | 7/2020 | Takahashi | G01C 21/3856 |
| 2020/0234613 A1* | 7/2020 | Takahashi | G09B 29/106 |

FOREIGN PATENT DOCUMENTS

| | | | |
|---|---|---|---|
| JP | 2012-212057 A | 11/2012 | |
| JP | 3201234 U | 11/2015 | |
| JP | 2016-173270 A | 9/2016 | |
| JP | 2017-10038 A | 1/2017 | |
| JP | 2017-62389 A | 3/2017 | |

OTHER PUBLICATIONS

Extended European Search Report dated Feb. 25, 2021, issued in EP Application No. 17933802.5.
International Search Report issued in International Patent Application No. PCT/JP2017/042950, dated Feb. 27, 2018, with English translation.
Notice of Reasons for Refusal issued in corresponding JP Application No. 2019-556471, dated Sep. 7, 2021 w/ English Translation.
First Office Action issued in corresponding Chinese Application 201780097206.2 dated Apr. 6, 2022, with English translation (14 pages).

\* cited by examiner

| | Static attribute value | | | | Dynamic attribute value | | | | Map expression data |
|---|---|---|---|---|---|---|---|---|---|
| | | | | | | User action information | | | |
| ID | Region-specifying information | Scale factor | Area | Completion level | Metadata | Number of DLs | Number of views per month | Average access time | Evaluation value | |
| M01 | (x11, y11) (x12, y12) | 1/10,000 | 28,000 | 4 | Illustrated map | 2310 | 328 | 5 m 12 s | 3.5 | |
| M02 | (x21, y21) (x22, y22) | 1/5,000 | 3,500 | 5 | Old map | 15708 | 1295 | 3 m 18 s | 4.5 | |
| M03 | (x31, y31) (x32, y32) (x33, y33) (x34, y34) (x35, y35) (x36, y36) (x37, y37) (x38, y38) | 1/8,000 | 5,400 | 3 | Old map | 239 | 58 | 1 m 50 s | 4.1 | |
| ... | ... | ... | ... | ... | ... | ... | ... | ... | ... | ... |

FIG. 6

| ID | Map identifier | Type information | Additional information ||||
|---|---|---|---|---|---|---|
| | | | Output information | URL | Display mode deciding information | Region specifying information |
| 1 | M02 | Advertisement | Restaurant X | https://www.X.jp | 1000yen | (x1, y1) |
| 2 | M02 | Advertisement | Shop Y | https://www.Y.com | 100yen | (x2, y2) (x3, y3) |
| ... | ... | ... | ... | ... | ... | ... |
| 53 | M02 | Condition | AA festival | http://www.AA.com | November 25 | (x4, y4) (x5, y5) |
| ... | ... | ... | ... | ... | ... | ... |
| 75 | - | Operation | - | - | Number of views per month ≥ 1000 | - |
| ... | ... | ... | ... | ... | ... | ... |
| 90 | M03 | Advertisement | Swimming pool P | http://www.P.jp | June 15 to September 5 | (x6, y6) |
| ... | ... | ... | ... | ... | ... | ... |

FIG.7

| ID | Place name information | Position information |
|---|---|---|
| 1 | A point | $(X_a, Y_a)$ |
| 2 | B point | $(X_b, Y_b)$ |
| ... | ... | ... |

FIG.8

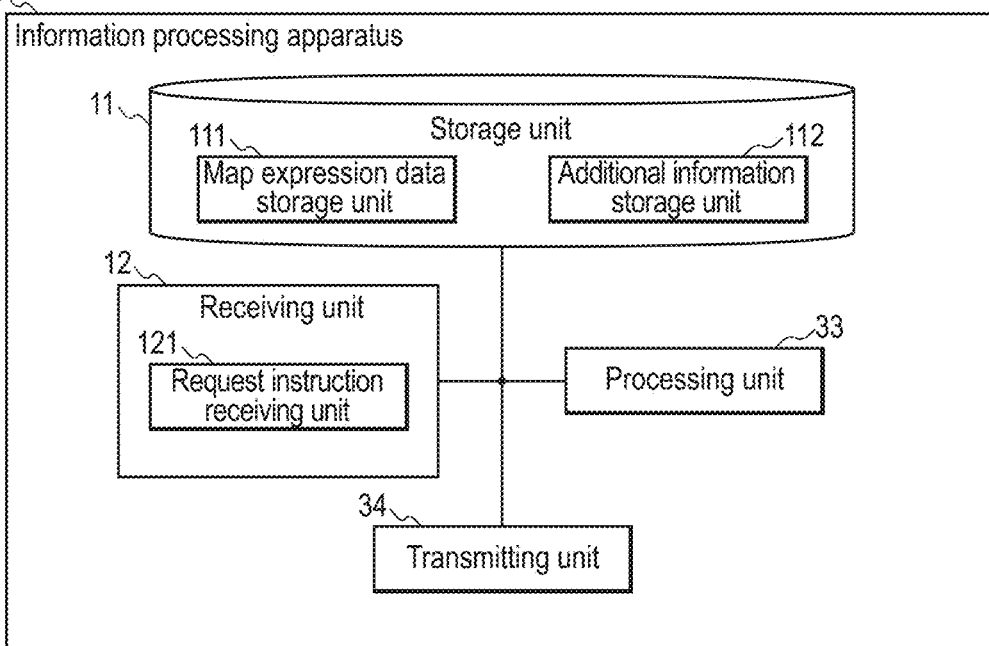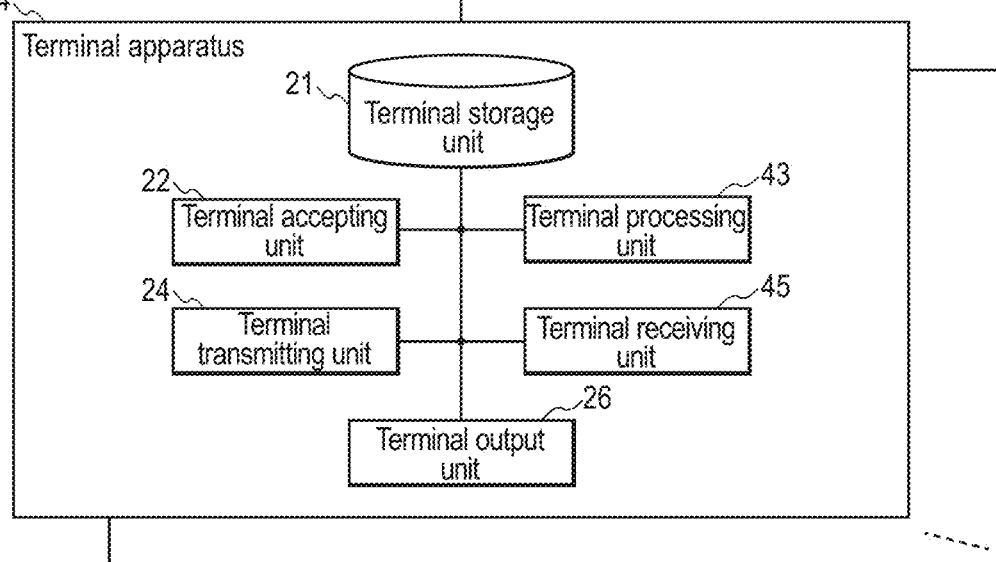
FIG.12

INFORMATION PROCESSING APPARATUS, INFORMATION PROCESSING METHOD, AND PROGRAM

CROSS REFERENCE

This patent application is the U.S. National Phase under 35 U.S.C. § 371 of International Application No. PCT/JP2017/106775, filed on Nov. 30, 2017, which the entire content of is hereby incorporated by reference.

TECHNICAL FIELD

The present invention relates to an information processing apparatus and the like for providing map expression data.

BACKGROUND ART

Conventionally, there is a system in which geographical information can be added to a hand-written map or the like and browsed (see Patent Document 1, for example). This system is a map information system including one or more terminal apparatuses and a server apparatus, wherein each terminal apparatus includes a terminal information transmitting unit that transmits terminal information having a map identifier of a map that is being output and current position information to the server apparatus, a point information receiving unit that receives point information, which is information regarding a point on a map, from the server apparatus, and an information output unit that outputs output information, which is information corresponding to the point information, and the server apparatus includes a map information storage unit in which position correspondence information, which is a pair of absolute position information and relative position information, is stored for each map identifier, a terminal information receiving unit that receives the terminal information, a point information acquiring unit that acquires point information using the terminal information, and a point information transmitting unit that transmits the point information to the terminal apparatus.

CITATION LIST

Patent Document

Patent Document 1: JP 2011-154172A

SUMMARY OF INVENTION

Technical Problem

However, according to conventional techniques, it is not possible to provide a user with map expression data whose display mode has been changed according to additional information. The map expression data is information in which a geographical region expressed is limited, and examples thereof include information such as an old map, an illustrated map, a sketch map, a hand-written map, and the like. The additional information is information that is additional to and is different from the map expression data.

Solution to Problem

A first aspect of the present invention is directed to an information processing apparatus including: a map expression data storage unit in which one or more pieces of map expression data expressing a map are stored, the data being associated with one or more attribute values containing region specifying information for specifying a region that is being expressed; an additional information storage unit in which additional information, which is information that is additional, is stored in association with the map expression data; and a transmitting unit that transmits map expression data to a terminal apparatus such that even same map expression data is displayed on the terminal apparatus in a different mode according to the additional information.

With this configuration, it is possible to provide a user with map expression data whose display mode has been changed according to additional information.

Furthermore, a second aspect of the present invention is directed to the information processing apparatus according to the first aspect, wherein the additional information includes region specifying information for specifying at least a partial region in the map expression data corresponding thereto, and advertisement information regarding an advertisement that is to be displayed together with the map expression data on a terminal apparatus, and the transmitting unit transmits map expression data in which a display mode of a region specified with region specifying information that is paired with the advertisement information is different from those of other regions, according to the advertisement information, to a terminal apparatus.

With this configuration, it is possible to provide a user with map expression data in which, according to advertisement information regarding an advertisement, a display mode of a region specified with region specifying information that is paired with the advertisement information is different from those of other regions.

Furthermore, a third aspect of the present invention is directed to the information processing apparatus according to the second aspect, wherein the advertisement information contains advertisement fee information for specifying an advertisement fee for a region specified with region specifying information that is paired with the advertisement information, and the transmitting unit transmits the map expression data such that a display mode of a region specified with the region specifying information that is paired with the advertisement fee information is different from those of other regions, according to the advertisement fee specified with the advertisement fee information.

With this configuration, it is possible to provide a user with map expression data in which, according to an advertisement fee, a display mode of a region specified with region specifying information that is paired with the advertisement information for specifying the advertisement fee is different from those of other regions.

Furthermore, a fourth aspect of the present invention is directed to the information processing apparatus according to the first aspect, wherein the additional information contains region specifying information for specifying a region in the map expression data, and condition information indicating a condition for the region specified with the region specifying information, and the transmitting unit transmits the map expression data such that, in a case in which a condition indicated by the condition information is satisfied, a display mode of a region specified with the region specifying information that is paired with the condition information is different from those of other regions.

With this configuration, it is possible to provide a user with map expression data in which, in a case in which a condition indicated by condition information corresponding to a region is satisfied, a display mode of the region specified with region specifying information that is paired with the condition information is different from those of other regions.

Furthermore, a fifth aspect of the present invention is directed to the information processing apparatus according to the fourth aspect, wherein the condition information contains date condition, which is a condition regarding a date.

With this configuration, it is possible to provide a user with map expression data in which, in a case in which a date condition corresponding to a region is satisfied, a display mode of the region specified with region specifying information that is paired with the date condition is different from those of other regions.

Furthermore, a sixth aspect of the present invention is directed to the information processing apparatus according to the first aspect, wherein the additional information contains operation information regarding a user's operation on map expression data corresponding to the additional information on a terminal apparatus, and the transmitting unit transmits the map expression data such that even same map expression data is output in a different mode according to the operation information.

With this configuration, it is possible to provide a user with map expression data that is different according to operation information.

Furthermore, a seventh aspect of the present invention is directed to the information processing apparatus according to any one of the first to sixth aspects, wherein the map expression data is displayed in a different mode also according to a current position acquired by the terminal apparatus.

With this configuration, it is possible to provide a user with map expression data in a display mode that is different also according to a current position of a user.

Furthermore, an eighth aspect of the present invention is directed to the information processing apparatus according to any one of the first to seventh aspects, further including a configuring unit that configures output map expression data that is map expression data that is to be output in a different mode according to the additional information, wherein the transmitting unit transmits the output map expression data to the terminal apparatus.

With this configuration, it is possible to configure output map expression data whose display mode has been changed according to additional information, and to transmit it to a terminal apparatus.

Furthermore, a ninth aspect of the present invention is directed to the information processing apparatus according to any one of the first to seventh aspects, wherein the transmitting unit transmits the map expression data and the additional information to the terminal apparatus.

With this configuration, it is possible to enable a terminal apparatus to configure map expression data whose display mode has been changed according to additional information and display the data, by transmitting map expression data and additional information to the terminal apparatus.

Furthermore, a tenth aspect of the present invention is directed to the information processing apparatus according to any one of the first to ninth aspects, wherein the map expression data in the different mode is different in terms of any one or more of a scale of the data displayed on the terminal apparatus, a region displayed on the terminal apparatus, and an orientation of the data displayed on the terminal apparatus.

With this configuration, it is possible to provide a user with map expression data in which any one or more of a display scale, a region that is to be displayed, and an orientation has been changed, according to additional information.

Furthermore, an eleventh aspect of the present invention is directed to the information processing apparatus according to any one of the first to ninth aspects, wherein the map expression data in the different mode is map expression data in which an image of a partial region thereof has a different attribute value.

With this configuration, it is possible to provide a user with map expression data in which an attribute value of the image has been changed according to additional information.

Advantageous Effects of Invention

With the information processing apparatus according to the present invention, it is possible to provide a user with map expression data whose display mode has been changed according to additional information.

BRIEF DESCRIPTION OF DRAWINGS

FIG. 6 shows a map expression data management table in this embodiment.

FIG. 7 shows an additional information management table in this embodiment.

FIG. 8 shows a place name/position correspondence table in this embodiment.

FIG. 12 is a block diagram of an information system B in Embodiment 2.

DESCRIPTION OF EMBODIMENT

Figure 1:
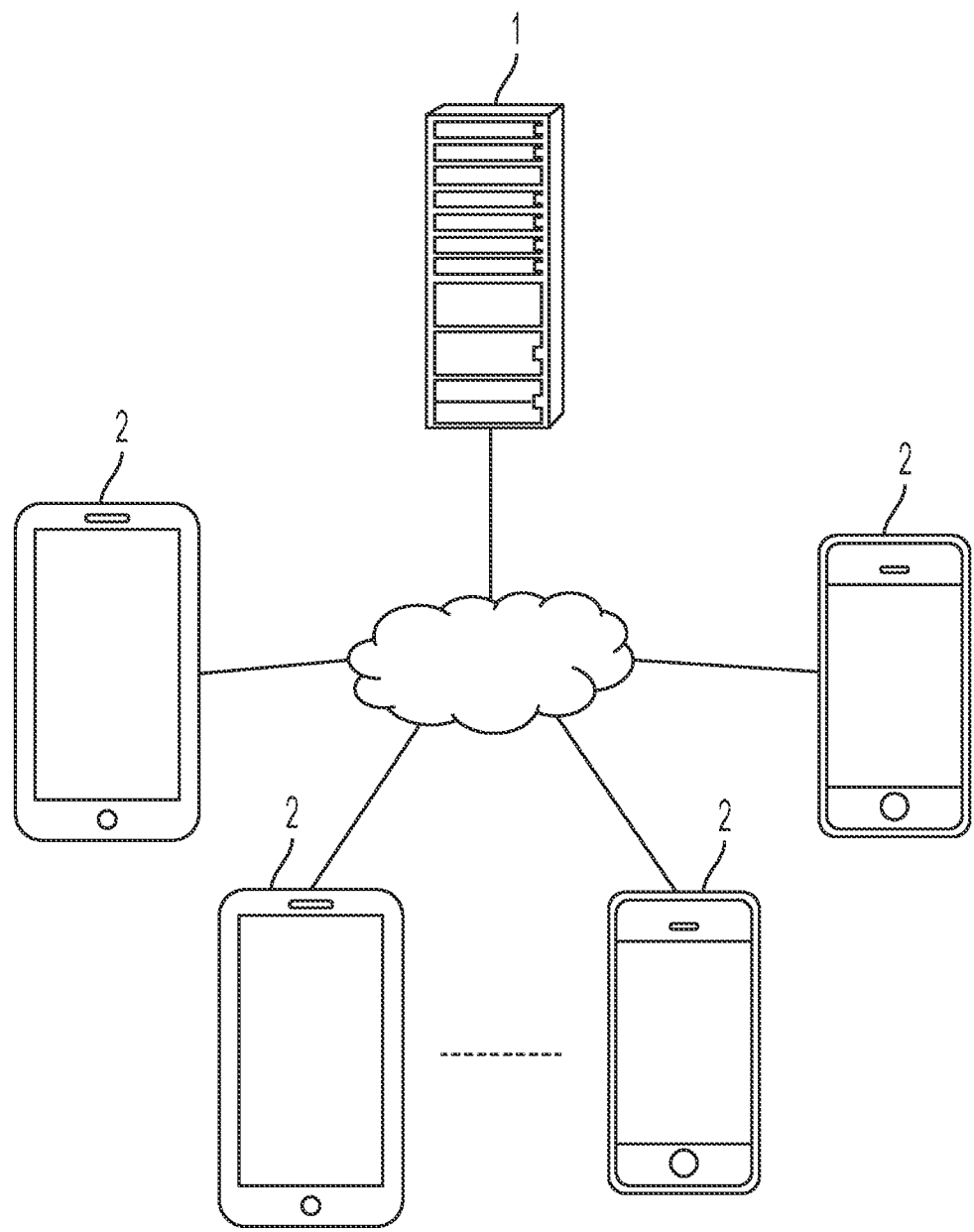
FIG. 1 is a conceptual diagram of an information system A in Embodiment 1.

Hereinafter, an embodiment of an information processing apparatus and the like will be described with reference to the drawings. It should be noted that constituent elements denoted by the same reference numerals in the embodiments perform similar operations, and thus a description thereof may not be repeated.

Embodiment 1

In this embodiment, an information system will be described in which additional information is associated with map expression data, and a display mode of the map expression data is different according to the additional information. In this embodiment, the output map expression data whose display mode is different according to the additional information is configured by an information processing apparatus.

FIG. 1 is a conceptual diagram of an information system A in this embodiment. The information system A includes an information processing apparatus 1 and one or at least two terminal apparatuses 2. The information processing apparatus 1 is a so-called server apparatus, such as a cloud server or an ASP server, and there is no limitation on the type thereof. Each terminal apparatus 2 is a terminal that is used by a user, such as a so-called smartphone, tablet device, laptop, or PC, and there is no limitation on the type thereof.

Figure 2:
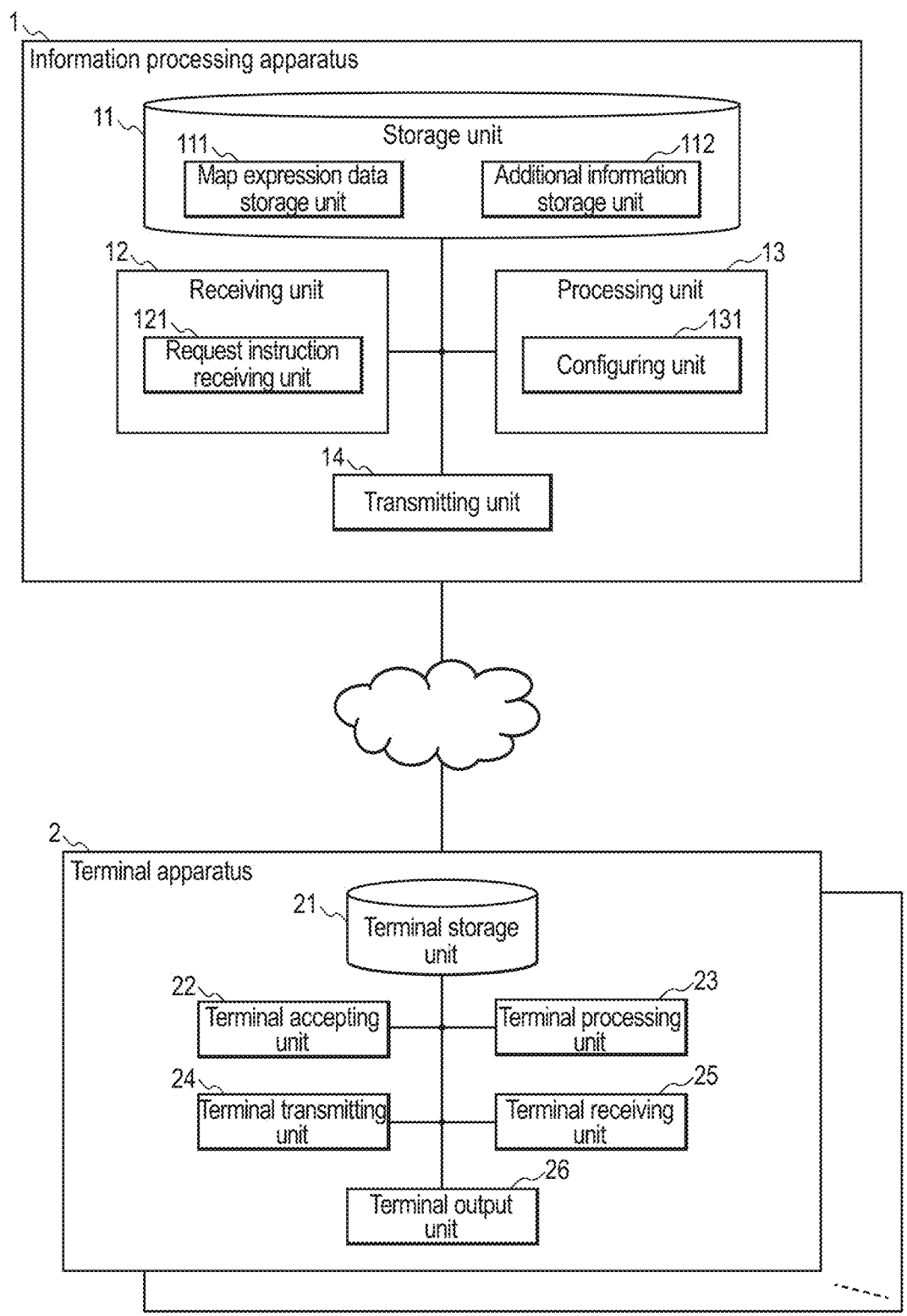
FIG. 2 is a block diagram of the information system A in this embodiment.

FIG. 2 is a block diagram of the information system A in this embodiment.

The information processing apparatus 1 constituting the information system A includes a storage unit 11, a receiving unit 12, a processing unit 13, and a transmitting unit 14. The storage unit 11 includes a map expression data storage unit 111, and an additional information storage unit 112. The receiving unit 12 includes a request instruction receiving unit 121. The processing unit 13 includes a configuring unit 131.

The terminal apparatus 2 includes a terminal storage unit 21, a terminal accepting unit 22, a terminal processing unit 23, a terminal transmitting unit 24, a terminal receiving unit 25, and a terminal output unit 26.

In the storage unit 11 constituting the information processing apparatus 1, various types of information are stored. The various types of information are, for example, later-described map expression data, or later-described additional information.

In the map expression data storage unit 111, one or at least two pieces of map expression data are stored. The map expression data is data expressing a map. The map expression data is information in which a geographical region expressed is limited. The map expression data is preferably associated with a map identifier for identifying the map expression data. The map identifier is, for example, an ID, a name of a file containing map expression data, a name of map expression data, or the like. The map expression data is, for example, an old map, an illustrated map, a sketch map, a hand-written map, or the like, but there is no limitation on the type thereof. The map expression data is typically image data, but may also be vector data or the like, and there is no limitation on the data structure thereof.

The map expression data is typically associated with one or at least two attribute values. The one or more attribute values associated with the map expression data are attribute values of map expression data. The attribute values are information indicating properties or features of map expression data, or the like. The one or more attribute values associated with the map expression data contain region specifying information. The region specifying information is information for specifying a region represented by the map expression data. The region is typically in the shape of a rectangle, but may be in the shape other than a rectangle, such as a triangle, an octagon, a circle, or the like. The region represented by map expression data may also be said to be a region expressed by map expression data. The region specifying information is, for example, a group of (latitude, longitude). The region specifying information is, for example, a group of information of relative coordinate sets from a reference point. Note that there is no limitation on the data structure of the region specifying information, and the region specifying information may be any information as long as it is information for specifying a region.

The one or more attribute values associated with the map expression data are, for example, static attribute values, which are attribute values that are static. The one or more attribute values associated with the map expression data are, for example, dynamic attribute values that dynamically change. The one or more attribute values may include one or more static attribute values and one or more dynamic attribute values.

The static attribute values are, for example, a scale factor of map expression data as a map (simply referred to as a "scale factor" as appropriate), an area of a region indicated by map expression data, on a map (simply referred to as an "area" as appropriate), or content information indicating the content of a map. The content information is a completion level of map expression data, a theme of map expression data, metadata or a keyword corresponding to map expression data, or the like. The metadata or keyword is, for example, the type of map expression data, a name or a landscape or place that is in a region in map expression data, or the like. The type of map expression data is, for example, "theme park" indicating that it is a map of a theme park, "sightseeing map" indicating that it is a map for sightseeing, information indicating that it is a map of a specific region (e.g., a school, etc.), or the like.

The dynamic attribute values are, for example, a distance between a position indicated by position specifying information and a representative point of map expression data, or user action information regarding an action of a user to map expression data. The user action information is, for example, information that can be acquired based on later-described operation information.

The representative point of map expression data is, for example, a center of gravity of map expression data, any point at an end of map expression data, or any point constituting a boundary of a region in map expression data.

It is preferable that the map expression data is contained in a file. Note that the map expression data may also be data in a database, and there is no limitation on the data format, and management method. If the map expression data is contained in a file, two or more pieces of map expression data may be contained in the file. It is also possible that one piece of map expression data is realized by two or more files. That is to say, it is also possible that one piece of map expression data is divided into two or more files.

Additional information, which is information that is additional, is stored in the additional information storage unit 112. The additional information is information that is associated with and is additional to map expression data. The additional information is associated with the map expression data. The state of being associated with the map expression data may be a state of being contained in the map expression data. The state of being associated with the map expression data is, for example, a state in which the additional information is linked to the map expression data, a state in which the additional information is associated with an identifier of the map expression data, a state in which the additional information contains an identifier of the map expression data, or the like.

It is sufficient that the additional information is associated with the map expression data, and there is no limitation on the type or content thereof. The additional information may also be said to be information that is used to change the display of map expression data that is to be output.

The additional information contains, for example, region specifying information and advertisement information. In this case, typically, an advertisement corresponding to the advertisement information is an advertisement related to a region specified with the region specifying information.

The region specifying information is information for specifying at least a partial region in the map expression data corresponding thereto. The region specifying information is, for example, coordinate values of two points forming a rectangle. The coordinate values of two points are, for example, information of points indicating relative positions in the map expression data. Note that the coordinate values of two points may also be, for example, (latitude, longitude). The region specifying information may also be, for example, information indicating one point. In this case, the region specifying information is, for example, information indicating a relative position of one point in the map expression data, or (latitude, longitude).

The advertisement information is information regarding an advertisement that is to be displayed together with the map expression data on the terminal apparatus 2. The advertisement information may contain an advertisement that is to be displayed together with the map expression data on the terminal apparatus 2. The advertisement information may contain, for example, advertisement fee information for specifying an advertisement fee. The advertisement is, for example, a still image, a moving image, a character string, audio, or a combination thereof, and there is no limitation on the data type.

The additional information contains, for example, region specifying information and condition information. In this case, typically, in a case in which a condition indicated by the condition information is satisfied, display of a region specified with the region specifying information that is paired with the condition information is changed.

The condition information is information indicating a condition for a region specified with the region specifying information that is paired with the condition information. The condition information contains, for example, a date condition, which is a condition regarding a date. The condition information contains, for example, a weather condition, which is a condition regarding weather. The condition information contains, for example, a time/date condition, which is a condition regarding the time and date.

The additional information contains, for example, operation information. The operation information is information regarding a user's operation on map expression data. The operation is a user's operation on the terminal apparatus 2. The map expression data is map expression data that is paired with the operation information. The operation information is, for example, information indicating that map expression data has been browsed, the number of times that map expression data is browsed, information for specifying a region that is displayed on the terminal apparatus 2, in the map expression data, or the like.

The receiving unit 12 receives various types of information, instructions, and the like from the terminal apparatus 2. The various types of information, instructions, and the like are, for example, a later-described request instruction, operation information, a map identifier, or the like.

The request instruction receiving unit 121 receives a request instruction from the terminal apparatus 2. The request instruction is an instruction to transmit map expression data. The instruction to transmit map expression data may also be an instruction to transmit later-described output map expression data.

The request instruction contains, for example, specifying information for specifying map expression data. The specifying information is, for example, a map identifier, position specifying information, or the like. If the specifying information is a map identifier, for example, map expression data identified with the map identifier may be selected as map expression data that is to be output, or map expression data satisfying a condition (e.g., that regions overlap each other) predetermined for map expression data identified with the map identifier may be selected. If the specifying information is position specifying information, map expression data corresponding to a position specified with the position specifying information is selected. The map expression data corresponding to a position is typically map expression data having a region containing the position.

The processing unit 13 performs various types of processing. The various types of processing are, for example, processes that are performed by the configuring unit 131. The various types of processing are, for example, a process that accumulates received operation information in the storage unit 11 in association with a map identifier that is paired with the operation information. Also, the various types of processing are, for example, a process that acquires later-described action information from received operation information, and accumulates it in the storage unit 11 in association with a map identifier.

The configuring unit 131 configures output map expression data in a display mode that is different according to additional information. The output map expression data is a type of map expression data. The output map expression data is map expression data obtained by changing part of the map expression data in the map expression data storage unit 111.

More specifically, the configuring unit 131 acquires map expression data corresponding to a request instruction, from the map expression data storage unit 111. Next, the configuring unit 131 acquires additional information associated with the acquired map expression data, from the additional information storage unit 112. Then, using the acquired additional information, the configuring unit 131 configures output map expression data in a display mode that is different according to the additional information, from the acquired map expression data.

If the additional information contains advertisement information, for example, the configuring unit 131 configures output map expression data in which a display mode of a region specified with region specifying information that is paired with the advertisement information is different from those of other regions, according to the advertisement information. The method for making a display mode different from those of other regions is, for example, changing a value of an image attribute such as luminance or color, changing a display scale (e.g., enlarging an image), arranging a pattern (e.g., a later-described black circle, etc.), or the like, and there is no limitation on the method.

Furthermore, if the advertisement information has advertisement fee information, the configuring unit 131 configures output map expression data in which a display mode of a region specified with region specifying information that is paired with the advertisement fee information is different from those of other regions, according to the advertisement fee specified with the advertisement fee information. For example, the configuring unit 131 configures output map expression data such that a region corresponding to an advertisement fee that is specified with advertisement fee information and is high enough to satisfy a predetermined condition is in a mode that is more conspicuous than that of a region corresponding to an advertisement fee not satisfying the condition. That is to say, it is preferable that the higher the advertisement fee payed by a company or the like, the more conspicuous the mode of an advertisement of the company or the like.

If the additional information contains condition information, for example, the configuring unit 131 configures output map expression data in which, in a case in which a condition indicated by the condition information is satisfied, a display mode of a region specified with the region specifying information that is paired with the condition information is different from those of other regions. For example, the configuring unit 131 configures output map expression data such that, in a case in which a condition indicated by the condition information is satisfied, a display mode of a region specified with the region specifying information that is paired with the condition information is more conspicuous than that of other regions.

If the additional information contains operation information, for example, the configuring unit 131 configures output map expression data such that even the same map expression data is in a different mode according to the operation information.

The output map expression data in a different mode is output map expression data that is map expression data that is to be output in a different mode according to the additional information, and, in this embodiment, it is data configured by the configuring unit 131. Note that, as will be described in Embodiment 2, the output map expression data that is in a different mode according to additional information may also be map expression data obtained by configuring map expression data received by a terminal apparatus into a different display mode according to additional information received by the terminal apparatus.

The transmitting unit 14 transmits the output map expression data configured by the configuring unit 131, to the terminal apparatus 2.

For example, the transmitting unit 14 transmits map expression data to the terminal apparatus 2 such that even the same map expression data is displayed on the terminal apparatus 2 in a different mode according to additional information.

For example, the transmitting unit 14 transmits map expression data in which a display mode of a region specified with region specifying information that is paired with the advertisement information is different from those of other regions, according to the advertisement information, to the terminal apparatus 2.

For example, the transmitting unit 14 transmits the map expression data such that a display mode of a region specified with the region specifying information that is paired with the advertisement fee information is different from those of other regions, according to the advertisement fee specified with the advertisement fee information. For example, the transmitting unit 14 transmits the map expression data such that a region corresponding to an advertisement fee that is specified with advertisement fee information and is high enough to satisfy a predetermined condition is output in a mode that is more conspicuous than that of a region corresponding to an advertisement fee not satisfying the condition.

For example, the transmitting unit 14 transmits the map expression data such that, in a case in which a condition indicated by the condition information is satisfied, a display mode of a region specified with the region specifying information that is paired with the condition information is different from those of other regions.

For example, the transmitting unit 14 transmits the map expression data such that even the same map expression data is output in a different mode according to the operation information.

In the terminal storage unit 21 constituting the terminal apparatus 2, various types of information are stored. The various types of information are, for example, a user identifier, a map identifier of output map expression data that has been output or the like, the whole or part of the output map expression data, or position specifying information indicating a current position.

The terminal accepting unit 22 accepts various types of instructions or information. The various types of instructions or information are, for example, a request instruction having specifying information, or various operations. The request instruction may or may not have a map identifier.

In this example, the accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The various types of instructions or information may be input by any part such as a touch panel, a keyboard, a mouse, a menu screen, or the like. The terminal accepting unit 22 may be realized by a device driver for an input part such as a touch panel or a keyboard, software for controlling a menu screen, or the like.

The terminal processing unit 23 performs various types of processing. The various types of processing are, for example, a process that configures information that is to be output, from the received information.

Furthermore, the various types of processing are, for example, a process that configures a request instruction that is to be transmitted, from the request instruction accepted by the terminal accepting unit 22. If the terminal accepting unit 22 accepts a request instruction, and the request instruction does not have a map identifier, for example, the terminal processing unit 23 acquires position information indicating the current position, acquires a user identifier from the terminal storage unit 21, and configures a request instruction having position specifying information having the position information and the user identifier. In this case, the request instruction may not have the user identifier.

Furthermore, if the terminal accepting unit 22 accepts a request instruction having a map identifier, the various types of processing are, for example, a process that configures a request instruction that is to be transmitted, from the request instruction accepted by the terminal accepting unit 22.

Furthermore, if the terminal accepting unit 22 accepts a request instruction, the request instruction does not have a map identifier, and a map or map expression data is displayed on the terminal apparatus 2, for example, the terminal processing unit 23 acquires position information of a representative point of a region in the displayed map or position information of a representative point of a region in the displayed map expression data, acquires a user identifier from the terminal storage unit 21, and configures a request instruction having position specifying information having the position information and the user identifier. In this case, the request instruction may not have the user identifier.

Furthermore, if the terminal accepting unit 22 accepts a request instruction, the request instruction does not have a map identifier, and a map or map expression data is displayed on the terminal apparatus 2, for example, the terminal processing unit 23 acquires the displayed map or the displayed map expression data, acquires a user identifier from the terminal storage unit 21, and configures a request instruction having the map or map expression data and the user identifier. In this case, the request instruction may not have the user identifier.

The terminal transmitting unit 24 transmits various types of instructions or information to the information processing apparatus 1. The terminal transmitting unit 24 transmits the information configured by the terminal processing unit 23, to the information processing apparatus 1. For example, the terminal transmitting unit 24 transmits a request instruction to the information processing apparatus 1.

The terminal receiving unit 25 receives various types of information from the information processing apparatus 1. The various types of information are, for example, output map expression data.

For example, the terminal receiving unit 25 receives one or at least two pieces of output map expression data from the information processing apparatus 1, in response to transmission of the request instruction.

The terminal output unit 26 outputs various types of information. The various types of information are information accepted by the terminal accepting unit 22, output map expression data received by the terminal receiving unit 25, or the like.

In this example, the output is typically display on a display screen.

Note that the output may be considered as a concept that encompasses projection using a projector, printing by a printer, transmission to an external apparatus (typically, a display apparatus), delivery of a processing result to another processing apparatus or another program, and the like.

The storage unit 11, the map expression data storage unit 111, the additional information storage unit 112, and the terminal storage unit 21 are preferably non-volatile storage media, but can also be realized by volatile storage media.

There is no limitation on the procedure in which information is stored in the storage unit 11 and the like. For example, information may be stored in the storage unit 11 and the like via a storage medium, information transmitted via a communication line or the like may be stored in the storage unit 11 and the like, or information input via an input device may be stored in the storage unit 11 and the like.

The receiving unit 12, the user position information receiving unit 121, the request instruction receiving unit 121, and the terminal receiving unit 25 are typically realized by wireless or wired communication parts, but can also be realized by broadcast receiving parts.

The processing unit 13, the configuring unit 131, and the terminal processing unit 23 may be realized typically by MPUs, memories, or the like. Typically, the processing procedure of the processing unit 13 and the like is realized by software, and the software is stored in a storage medium such as a ROM. Note that the processing procedure may be realized also by hardware (dedicated circuits).

The transmitting unit 14 is typically realized by a wireless or wired communication part, but can also be realized by a broadcasting part.

The terminal output unit 26 may be considered to include or to not include an output device such as a display screen or a speaker. The terminal output unit 26 may be realized by driver software for an output device, a combination of driver software for an output device and the output device, or the like.

Next, an operation of the information system A will be described. First, an operation example of the information processing apparatus 1 will be described with reference to the flowchart in FIG. 3.

(Step S301) The receiving unit 12 judges whether or not it has received a request instruction from the terminal apparatus 2. If it has received a request instruction, the procedure advances to step S302, and, if otherwise, the procedure advances to step S306.

(Step S302) The configuring unit 131 acquires a map identifier corresponding to the request instruction received in step S301. If the request instruction contains a map identifier, the configuring unit 131 acquires the map identifier contained in the request instruction. If the request instruction contains position specifying information indicating a current position of the terminal apparatus 2, for example, the configuring unit 131 acquires a map identifier, using region specifying information that is paired with the map expression data, and the position specifying information, the map identifier being an identifier of the map expression data that is paired with region specifying information indicating a region containing a position indicated by the position specifying information, from the map expression data storage unit 111. If the request instruction contains a map identifier of map expression data that is being output on the terminal apparatus 2, for example, the configuring unit 131 acquires another map identifier, from the map expression data storage unit 111, the map identifier being paired with region specifying information of a region overlapping a region indicated by region specifying information that is paired with the map identifier.

(Step S303) The configuring unit 131 acquires map expression data identified with the map identifier acquired in step S302, from the map expression data storage unit 111.

(Step S304) The configuring unit 131 performs a process that configures output map expression data using the map expression data acquired in step S303. The procedure then returns to step S301. This configuring processing will be described with reference to the flowchart in FIG. 4.

(Step S305) The transmitting unit 14 transmits the output map expression data configured in step S304, to the terminal apparatus 2 from which the request instruction was transmitted.

(Step S306) The receiving unit 12 judges whether or not it has received operation information or the like from the terminal apparatus 2. If it has received operation information or the like, the procedure advances to step S30, and, if otherwise, the procedure then returns to step S301.

(Step S307) The processing unit 13 accumulates at least part of the operation information or the like received in step S306, or information acquired using the operation information or the like received in step S306, in association with a map identifier contained in the operation information or the like. This information is accumulated in the additional information storage unit 112. The procedure then returns to step S301.

Figure 3:
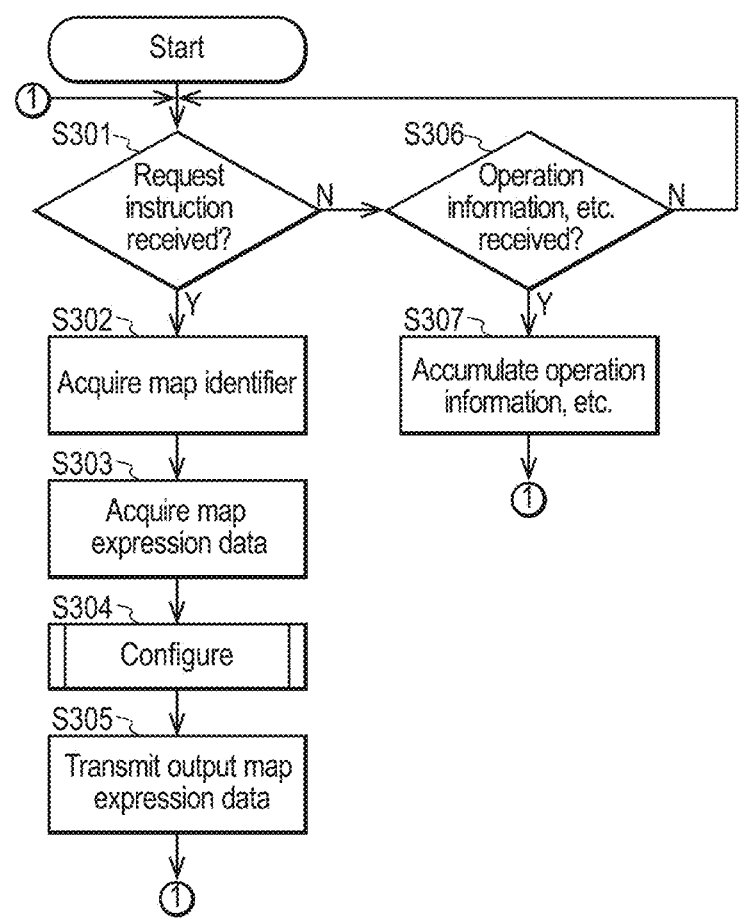
FIG. 3 is a flowchart illustrating an operation example of an information processing apparatus 1 in this embodiment.

In the flowchart in FIG. 3, it is also possible that the number of map identifiers acquired in step S302 is two or more. In this case, in step S304, the configuring unit 131 may configure two or more pieces of output map expression data. Then, in step S305, the transmitting unit 14 may transmit the configured two or more pieces of output map expression data to the terminal apparatus 2.

In the flowchart in FIG. 3, the processing ends at power off or at an interruption of ending processing.

Figure 4:
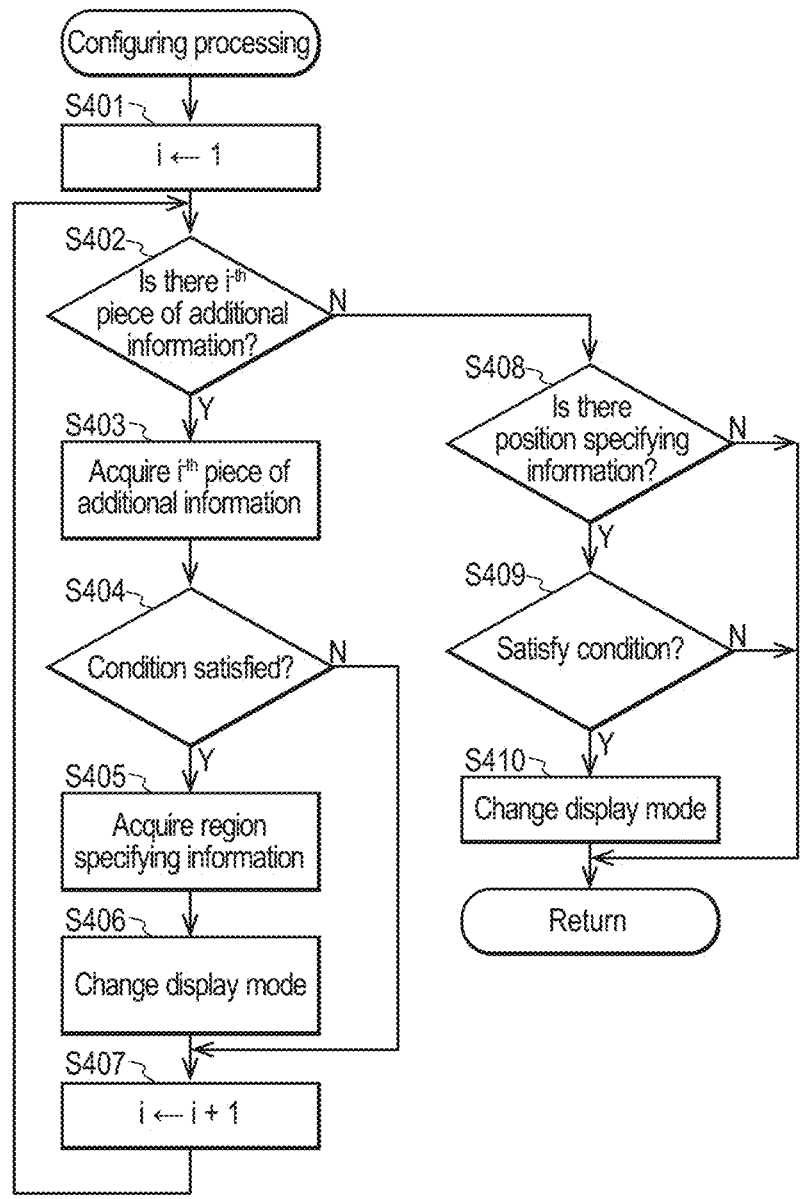
FIG. 4 is a flowchart illustrating an example of configuring processing in this embodiment.

Next, an example of the configuring processing in step S304 will be described with reference to the flowchart in FIG. 4.

(Step S401) The configuring unit 131 substitutes 1 for a counter i.

(Step S402) The configuring unit 131 judges whether or not an $i^{-th}$ piece of additional information corresponding to the map expression data acquired in step S303 is stored in the additional information storage unit 112. If there is an $i^{-th}$ piece of additional information, the procedure advances to step S403, and, if otherwise, the procedure advances to step S408.

(Step S403) The configuring unit 131 acquires the $i^{-th}$ piece of additional information, from the additional information storage unit 112.

(Step S404) The configuring unit 131 judges whether or not the additional information acquired in step S403 satisfies a condition. If it satisfies a condition, the procedure advances to step S405, and, if otherwise, the procedure advances to step S407. The condition may be different according to the type of additional information, or according to the additional information.

(Step S405) The configuring unit 131 acquires region specifying information contained in the $i^{-th}$ piece of additional information.

(Step S406) The configuring unit 131 changes an image of a region indicated by the region specifying information acquired in step S405, in the map expression data acquired in step S303, such that the display of the region is changed. The configuring unit 131 typically changes the display such that the region indicated by the region specifying information acquired in step S405 is more conspicuous than other regions. If the region specifying information acquired in step S405 is NULL (i.e., the region cannot be specified), for example, the display of the entire map expression data acquired in step S303 is changed.

(Step S407) The configuring unit 131 increments the counter i by 1.

The procedure then returns to step S402.

(Step S408) The configuring unit 131 judges whether or not the received request information contains position specifying information. If it contains position specifying information, the procedure advances to step S409, and, if otherwise, the procedure then returns to the upper-level processing.

(Step S409) The configuring unit 131 judges whether or not the position specifying information contained in the received request information satisfies a condition. If it satisfies a condition, the procedure advances to step S410, and, if otherwise, the procedure then returns to the upper-level processing. The state in which the position specifying information satisfies a condition is, for example, a state in which the position indicated by position specifying information is a position in a region indicated by the region specifying information that is paired with the map expression data acquired in step S303.

(Step S410) The configuring unit 131 changes the display mode of the map expression data that is to be output. The procedure then returns to the upper-level processing.

Next, an operation example of the terminal apparatus 2 will be described with reference to the flowchart in FIG. 5.

(Step S501) The terminal accepting unit 22 judges whether or not it has accepted a request instruction. If it has accepted a request instruction, the procedure advances to step S502, and, if otherwise, the procedure advances to step S506.

(Step S502) The terminal processing unit 23 configures a request instruction that is to be transmitted. For example, the terminal processing unit 23 acquires position specifying information indicating a current position, and configures a request instruction having the position specifying information. For example, the terminal processing unit 23 acquires a map identifier in the output map expression data that is being currently output, and configures a request instruction having the map identifier. For example, the terminal processing unit 23 acquires position specifying information indicating a position of a representative point of the output map expression data that is being currently output, and configures a request instruction having the position specifying information. For example, the terminal processing unit 23 configures a request instruction containing a map identifier contained in the request instruction accepted in step S501.

(Step S503) The terminal transmitting unit 24 transmits the request instruction configured in step S502 to the information processing apparatus 1.

(Step S504) The terminal receiving unit 25 judges whether or not it has received output map expression data from the information processing apparatus 1, in response to the transmission of the request instruction. If it has received output map expression data, the procedure advances to step S505, and, if otherwise, the procedure then returns to step S504.

(Step S505) The terminal output unit 26 displays the output map expression data received in step S504. The procedure then returns to step S501.

(Step S506) The terminal accepting unit 22 judges whether or not it has accepted an operation from a user. If it has accepted an operation, the procedure advances to step S507, and, if otherwise, the procedure then returns to step S501.

(Step S507) The terminal processing unit 23 and the like perform an operation according to the operation accepted in step S506.

(Step S508) The terminal processing unit 23 configures operation information or the like, according to the operation accepted in step S506. The operation information or the like is, for example, a map identifier, information for specifying a display region of map expression data that is being displayed, information indicating a point designated in map expression data that is being displayed, or the like.

(Step S509) The terminal transmitting unit 24 transmits the operation information or the like configured in step S508, to the information processing apparatus 1. The procedure then returns to step S501.

Hereinafter, a specific operation example of the information system A in this embodiment will be described. FIG. 1 is a conceptual diagram of the information system A.

It is assumed that, in the map expression data storage unit 111, the map expression data management table shown in FIG. 6 is stored. The map expression data management table manages one or more records each having "ID", "static attribute value", "dynamic attribute value", and "map expression data".

"ID" is a map identifier. "Static attribute value" is a static attribute value of map expression data, and, in this example, has region specifying information, a scale factor of map expression data, an area of map expression data, a completion level of map expression data, and metadata. The region specifying information is a group of (latitude, longitude), and, since the map expression data "ID=MO 1, M02" is in the shape of a rectangle, the region specifying information has information of (latitude, longitude) at the upper left point and the lower right point of the rectangle. Since the map expression data "ID=M03" has eight corners, the region specifying information has information of eight sets of (latitude, longitude). The metadata in this example is the type of map expression data. "Static attribute value" is, for example, information input by a company that operates the information processing apparatus 1.

"Dynamic attribute value" is a dynamic attribute value of map expression data, and, in this example, is user action information. The user action information is information acquired from operation information, which is information regarding a user's operation. The user action information in this example has "number of DLs", "number of views per month", "average access time", and "evaluation value".

"Number of DLs" is the total number of times that data is downloaded to one or more terminal apparatuses 2 to the present and displayed on the one or more terminal apparatuses 2. Note that "number of DLs" may also be the total number of times that data is downloaded to one or more terminal apparatuses 2 to the present. "Number of views per month" is the total number of times that data is displayed on one or more terminal apparatuses 2 in that month or the previous month. "Average access time" is an average of time periods during which data is displayed on terminal apparatuses 2. "Evaluation value" is an average of evaluation values input by users.

"Dynamic attribute value" is information acquired by the processing unit 13 of the information processing apparatus 1 using operation information received from the terminal apparatus 2. That is to say, for example, in the case in which map expression data is displayed on the terminal apparatus 2, the receiving unit 12 of the information processing apparatus 1 receives a map identifier of the displayed map expression data. The processing unit 13 increments "number of DLs" and "number of views per month" paired with the map identifier by 1. Note that, after a map identifier of the displayed map expression data is received, the processing unit 13 starts measurement of the display time period using an unshown clock.

Furthermore, in the case in which map expression data becomes undisplayed on the terminal apparatus 2, the receiving unit 12 of the information processing apparatus 1 receives information indicating that the data becomes undisplayed or a map identifier. The processing unit 13 acquires the time period during which the map expression data is displayed on the terminal apparatus 2 (time elapsed after the start of measurement of the display time period). The processing unit 13 changes "average access time" using this time period.

Furthermore, the receiving unit 12 of the information processing apparatus 1 receives a map identifier and an evaluation value from the terminal apparatus 2. The processing unit 13 changes the average of evaluation values paired with the map identifier. The processing unit 13 may calculate an evaluation value, using a dynamic attribute value. For example, the processing unit 13 calculates an evaluation value such that the larger any one or more of "number of DLs", "number of views per month", and "average access time" is, the higher the evaluation value is.

"Map expression data" in this example is image data. It will be appreciated that "map expression data" may also be an image file.

In the additional information storage unit 112, the additional information management table shown in FIG. 7 is stored. The additional information management table contains one or at least two records each having "ID", "type information", and "additional information". "Additional information" has "output information", "URL", "display mode deciding information", and "region deciding information". "ID" is information for identifying a record. "Type information" is information indicating the type of additional information, and, in this example, "type information" is, for example, "advertisement" indicating that the additional information contains advertisement information, "condition" indicating that the additional information contains condition information, or "operation" indicating that the additional information contains operation information. "Output information" is information that is arranged on map expression data. "URL" is a URL of a web page that is called upon when "output information" is designated. "Display mode deciding information" is information that is used to decide on a display mode, and is information for specifying a condition regarding change of a display. "Region deciding information" is information indicating a region in which a display mode can be changed. If "region deciding information" is NULL "-", the entire output map expression data may be changed.

Furthermore, the storage unit 11 has the place name/position correspondence table shown in FIG. 8. The place name/position correspondence table is a table indicating correspondence between place name information and position information.

Figure 9:
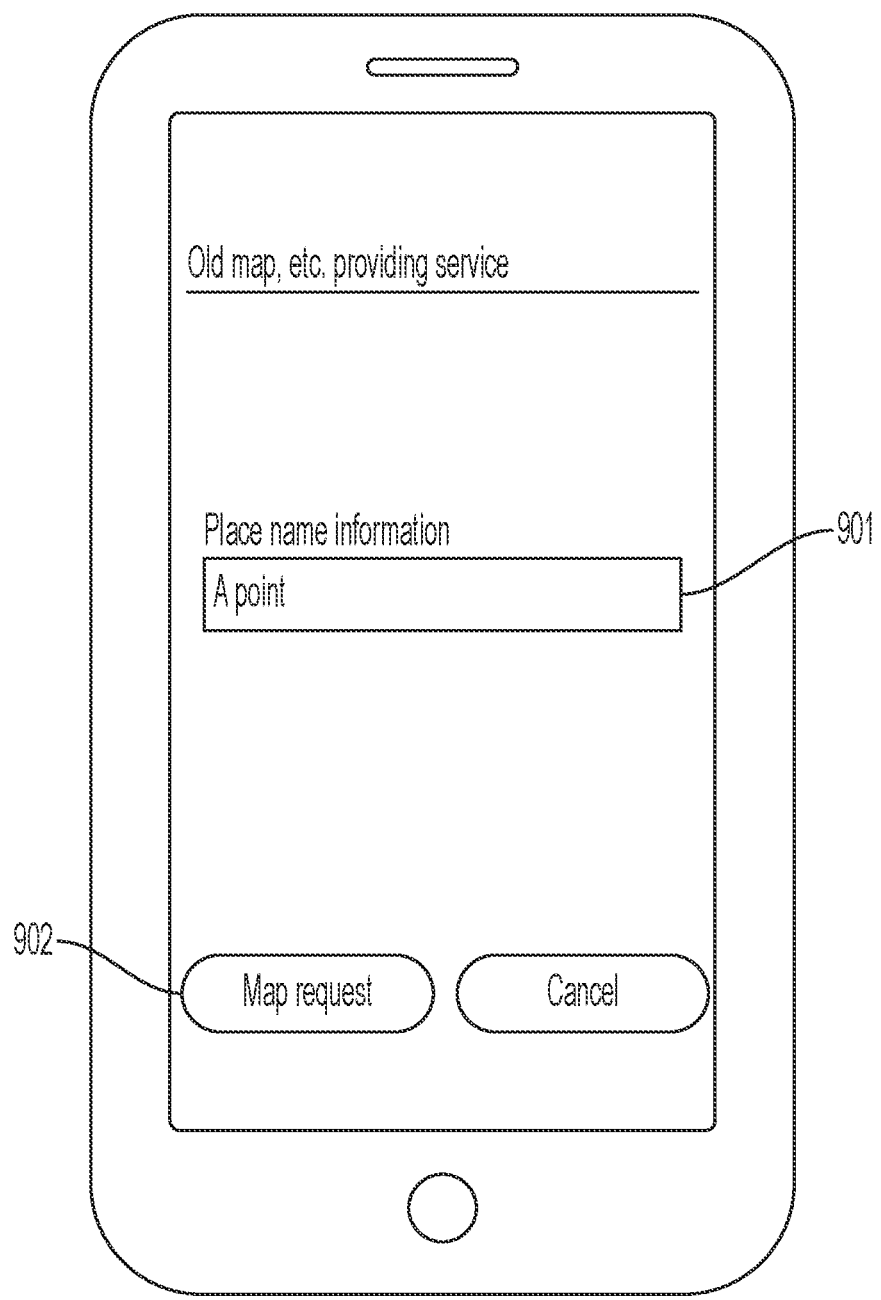
FIG. 9 shows a screen example in this embodiment.

It is assumed that, in this situation, a screen of an app "old map, etc. providing service" shown in FIG. 9 is displayed on the terminal apparatus 2 of a user.

It is assumed that the user inputs place name information "A point" (see 901 in FIG. 9), and presses a map request button 902 in FIG. 9. Then, the terminal accepting unit 22 accepts an instruction to request map expression data. Next, since the accepted request instruction contains place name information, the terminal processing unit 23 acquires position specifying information "A point". Next, the terminal processing unit 23 configures a request instruction having the position specifying information "A point". Next, the terminal transmitting unit 24 transmits the request instruction to the information processing apparatus 1.

Next, the receiving unit 12 of the information processing apparatus 1 receives the request instruction having the position specifying information "A point" from the terminal apparatus 2.

Next, the configuring unit 131 acquires position information $(x_a, y_a)$ that is paired with the received position specifying information "A point", from the place name/position correspondence table in FIG. 8. Then, the configuring unit 131 searches the map expression data management table in FIG. 6 for map expression data with a region containing the position information $(x_a, y_a)$. It is assumed that the configuring unit 131 judges that the position information $(x_a, y_a)$ is contained in the region specified with the region specifying information of the record with "ID=M02". Then, the configuring unit 131 acquires map expression data identified with "M02", from the map expression data management table in FIG. 6.

Next, the configuring unit 131 acquires a first piece of additional information (additional information with "ID=1"), a second piece of additional information (additional information with "ID=2"), a third piece of additional information (additional information with "ID=53"), and a fourth piece of additional information (additional information with "ID=75") that are paired with the map identifier "M02", from the additional information management table shown in FIG. 7.

Figure 10:
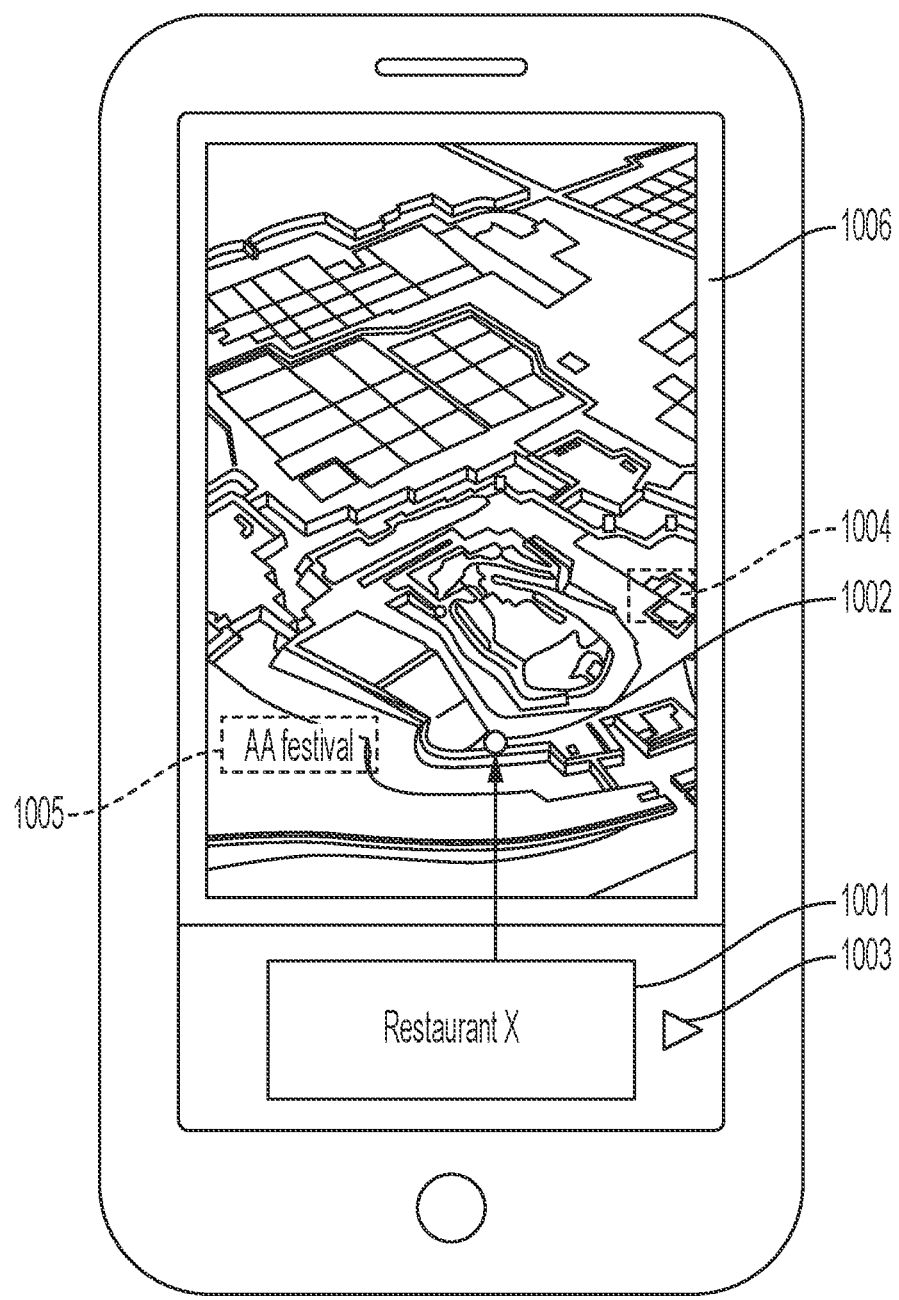
FIG. 10 shows a screen example in this embodiment.

Next, the configuring unit 131 acquires two pieces of advertisement fee information (1000 yen with "ID=1", and 100 yen with "ID=2") corresponding to the type information "advertisement", and decides to give priority to the advertisement information (output information) with "ID=1" with the highest advertisement fee indicated by the advertisement fee information, over the advertisement information with "ID=2". Then, the configuring unit 131 configures map expression data by adding the output information with "ID=2" to the map expression data "M02". In FIG. 10, 1001 denotes this output information with "ID=2". The configuring unit 131 adds a pattern (a black circle, in this example) 1102 to a position indicated by region specifying information $(x_1, y_1)$ with "ID=2", and further adds a line connecting the advertisement 1101 and the pattern 1102.

Furthermore, when the user designates a button (triangle) 1103 indicating that there is a next advertisement, the configuring unit 131 configures a screen displaying the output information with "ID=2", using the map expression data "M02". It is assumed that the configuring unit 131 takes the pieces of output information with "ID=1" and "ID=2" as buttons, and adds the corresponding URLs to the respective buttons. That is to say, when a user designates output information taken as a button, a web page identified with a URL that has been added is displayed on the terminal apparatus 2.

Next, the configuring unit 131 acquires display mode deciding information "November 25" of a third piece of additional information (additional information with "ID=53"). This information is a date condition. Then, the configuring unit 131 acquires the day's date "November 5" from an unshown clock. Then, the configuring unit 131 judges whether or not this date satisfies a condition that is held in advance "one month before date indicated by date condition≤day's date≤date indicated by date condition" (i.e., a condition that the day in question is in the range from one month before the date indicated by the date condition (the day of AA festival, in this example) to the date indicated by the date condition). It is assumed that the condition that is held in advance is stored in the storage unit 11.

Furthermore, since the day's date "November 5" is within one month before the date of AA festival "November 25", the configuring unit 131 judges that the date satisfies the condition. Next, the configuring unit 131 adds the output information "AA festival" with "ID=53" to a rectangular region 1105 specified with the region specifying information $(x_4, y_4)$ $(x_5, y_5)$ of "ID=53".

Furthermore, the configuring unit 131 adds the URL with "ID=53" to the button of the rectangular region 1105. When a user presses the button of the rectangular region 1105, the web page (website of AA festival) identified with the corresponding URL is displayed.

Next, the configuring unit 131 acquires display mode deciding information "number of views per month≥1000" contained in the fourth piece of additional information (additional information with "ID=75"), from the table in FIG. 7. Then, the configuring unit 131 acquires the number of views per month "1295" that is paired with "M02", from the table in FIG. 6. Next, the configuring unit 131 judges that the number of views per month "1295" satisfies a condition indicated by the display mode deciding information "number of views per month≥1000". Next, the configuring unit 131 increases the luminance of the entire map expression data, and changes the entirety into a conspicuous mode, thereby configuring output map expression data. The hatching around the map expression data FIG. 10 indicates that the luminance has been increased.

Next, the transmitting unit 14 transmits the configured output map expression data, to the terminal apparatus 2 from which the request instruction was transmitted.

Next, in response to the transmission of the request instruction, the terminal receiving unit 25 of the terminal apparatus 2 receives the output map expression data from the information processing apparatus 1.

Next, the terminal output unit 26 displays the received output map expression data. FIG. 10 shows the output example.

Next, when the user presses the button of the advertisement of a restaurant X in FIG. 10, a web page (website of the restaurant X) identified with the URL corresponding to the button is output to the terminal apparatus 2.

Figure 11:
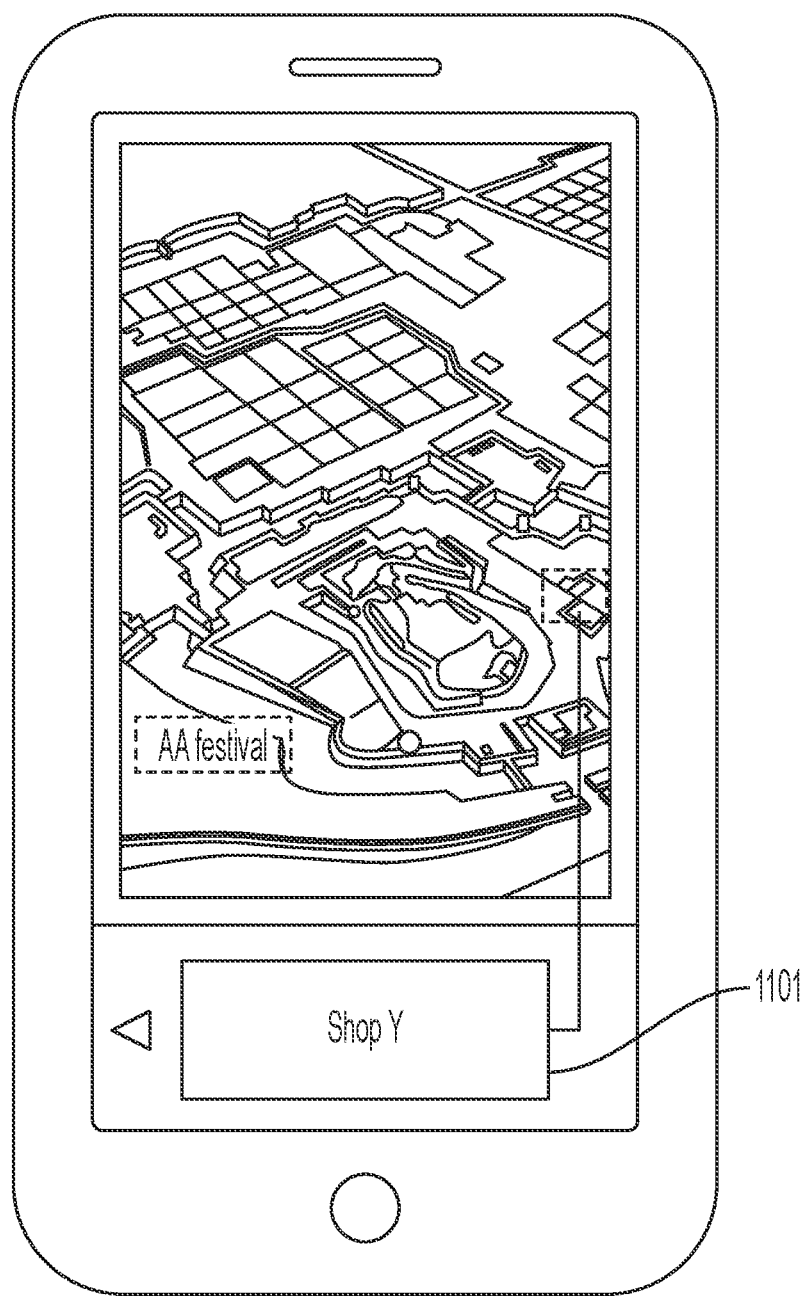
FIG. 11 shows a screen example in this embodiment.

Furthermore, when the user presses the button 1103, an advertisement of "Shop Y" is displayed in the advertisement region as shown in FIG. 11.

As described above, according to this embodiment, it is possible to provide a user with map expression data whose display mode has been changed according to additional information.

Furthermore, according to this embodiment, it is possible to provide a user with map expression data in which, according to an advertisement fee, a display mode of a region specified with region specifying information that is paired with the advertisement information for specifying the advertisement fee is different from those of other regions.

Furthermore, according to this embodiment, it is possible to provide a user with map expression data in which, in a case in which a condition indicated by condition information corresponding to a region is satisfied, a display mode of the region specified with region specifying information that is paired with the condition information is different from those of other regions.

Furthermore, according to this embodiment, it is possible to provide a user with map expression data in which, in a case in which a date condition corresponding to a region is satisfied, a display mode of the region specified with region specifying information that is paired with the date condition is different from those of other regions.

Furthermore, according to this embodiment, it is possible to provide a user with map expression data that is different according to operation information.

According to the specific example of this embodiment, the processing that changes the map expression data that is to be output, using the current position of the user was not performed. However, it is also possible to perform processing in which the configuring unit 131 changes the map expression data that is to be output, using the current position of the user. For example, it is also possible to judge whether or not a position indicated by position specifying information for specifying the current position of the user is in a region indicated by region specifying information corresponding to the map expression data, and to change the display mode of the map expression data according to whether or not the position is in the region. In this case, it is possible to provide a user with map expression data in a display mode that is different also according to a current position of a user. The same applies to Embodiment 2.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the information processing apparatus 1 in this embodiment is, for example, the following sort of program. Specifically, this program is a program for causing a computer capable of accessing a storage medium including a map expression data storage unit in which one or more pieces of map expression data expressing a map are stored, the data being associated with one or more attribute values containing region specifying information for specifying a region that is being expressed, and an additional information storage unit in which additional information, which is information that is additional, is stored in association with the map expression data, to function as: a transmitting unit that transmits map expression data to a terminal apparatus such that even same map expression data is displayed on the terminal apparatus in a different mode according to the additional information.

Furthermore, it is preferable that the program causes the computer to further function as a configuring unit that configures output map expression data that is map expression data that is to be output in a different mode according to the additional information, wherein the transmitting unit transmits the output map expression data to the terminal apparatus.

Embodiment 2

This embodiment is different from Embodiment 1 in that the output map expression data is configured not in the information processing apparatus but in the terminal apparatus.

A conceptual diagram of an information system B in this embodiment is the same as that in FIG. 1, except for the reference numerals of the constituent elements. The information system B includes an information processing apparatus 3 and one or at least two terminal apparatuses 4. The information processing apparatus 3 is a so-called server apparatus, such as a cloud server or an ASP server, and there is no limitation on the type thereof. Each terminal apparatus 4 is a terminal that is used by a user, such as a so-called smartphone, tablet device, laptop, or PC, and there is no limitation on the type thereof.

FIG. 12 is a block diagram of the information system B in this embodiment.

The information processing apparatus 3 includes the storage unit 11, the receiving unit 12, a processing unit 33, and a transmitting unit 34.

The terminal apparatus 4 includes the terminal storage unit 21, the terminal accepting unit 22, a terminal processing unit 43, the terminal transmitting unit 24, a terminal receiving unit 45, and the terminal output unit 26.

The processing unit 33 constituting the information processing apparatus 3 performs various types of processing. The various types of processing are, for example, a process that acquires map expression data and one or at least two pieces of additional information corresponding to a received request instruction. Also, the various types of processing are, for example, a process that configures information that is to be transmitted, according to a received request instruction.

The transmitting unit 34 transmits the map expression data and the one or more pieces of additional information acquired by the processing unit 33, to the terminal apparatus 4. The transmitting unit 34 transmits the information configured by the processing unit 33, to the terminal apparatus 4.

The transmitting unit 34 transmits map expression data to the terminal apparatus 4 such that even the same map expression data is displayed on the terminal apparatus 4 in a different mode according to additional information.

The transmitting unit 34 transmits map expression data in which a display mode of a region specified with region specifying information that is paired with the advertisement information is different from those of other regions, according to the advertisement information, to the terminal apparatus 4.

The transmitting unit 34 transmits the map expression data such that a display mode of a region specified with the region specifying information that is paired with the advertisement fee information is different from those of other regions, according to the advertisement fee specified with the advertisement fee information.

The transmitting unit 34 transmits the map expression data such that, in a case in which a condition indicated by the condition information is satisfied, a display mode of a region specified with the region specifying information that is paired with the condition information is different from those of other regions.

The transmitting unit 34 transmits the map expression data such that even the same map expression data is output in a different mode according to the operation information.

The terminal processing unit 43 constituting the terminal apparatus 4 performs various types of processing. The various types of processing are, for example, a process that configures output map expression data using the map expression data and the one or more pieces of additional information received by the terminal receiving unit 45. This process that configures output map expression data is similar to the above-described process of the configuring unit 131, which has been already described, and thus a detailed description thereof has been omitted.

The terminal receiving unit 45 receives the map expression data and the one or more pieces of additional information from the information processing apparatus 3.

The processing unit 33 and the terminal processing unit 43 may be realized typically by MPUs, memories, or the like. Typically, the processing procedure of the processing unit 33 is realized by software, and the software is stored in a storage medium such as a ROM. Note that the processing procedure may be realized also by hardware (dedicated circuits).

The transmitting unit 34 and the terminal transmitting unit 24 are typically realized by wireless or wired communication parts, but can also be realized by broadcasting parts.

The terminal receiving unit 45 is typically realized by a wireless or wired communication part, but can also be realized by a broadcast receiving part.

Next, an operation of the information system B will be described. First, an operation example of the information processing apparatus 3 will be described with reference to the flowchart in FIG. 13. In the flowchart in FIG. 13, a description of the steps similar to those in the flowchart in FIG. 3 has been omitted.

(Step S1301) The processing unit 33 acquires one or more pieces of additional information paired with the map expression data acquired in step S303, from the additional information storage unit 112.

(Step S1302) The transmitting unit 34 transmits the map expression data acquired in step S303 and the one or more pieces of additional information acquired in step S1301, to the terminal apparatus 4. The procedure then returns to step S301.

Figure 13:
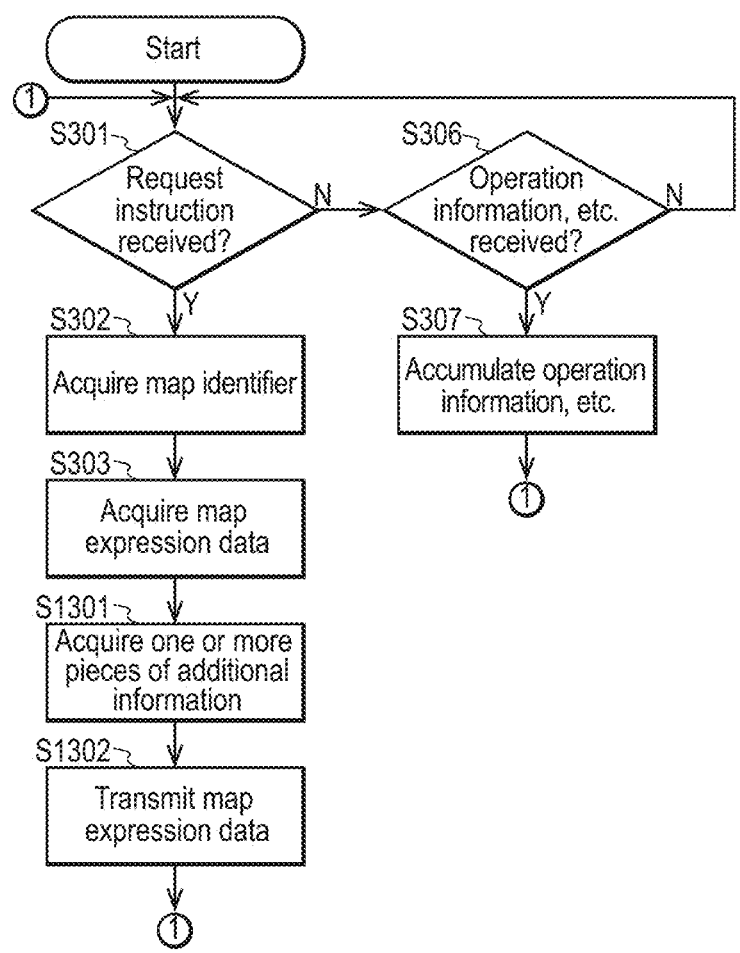
FIG. 13 is a flowchart illustrating an operation example of an information processing apparatus 3.

In the flowchart in FIG. 13, the processing ends at power off or at an interruption of ending processing.

Next, an operation example of the terminal apparatus 4 will be described with reference to the flowchart in FIG. 14.

Figure 5:
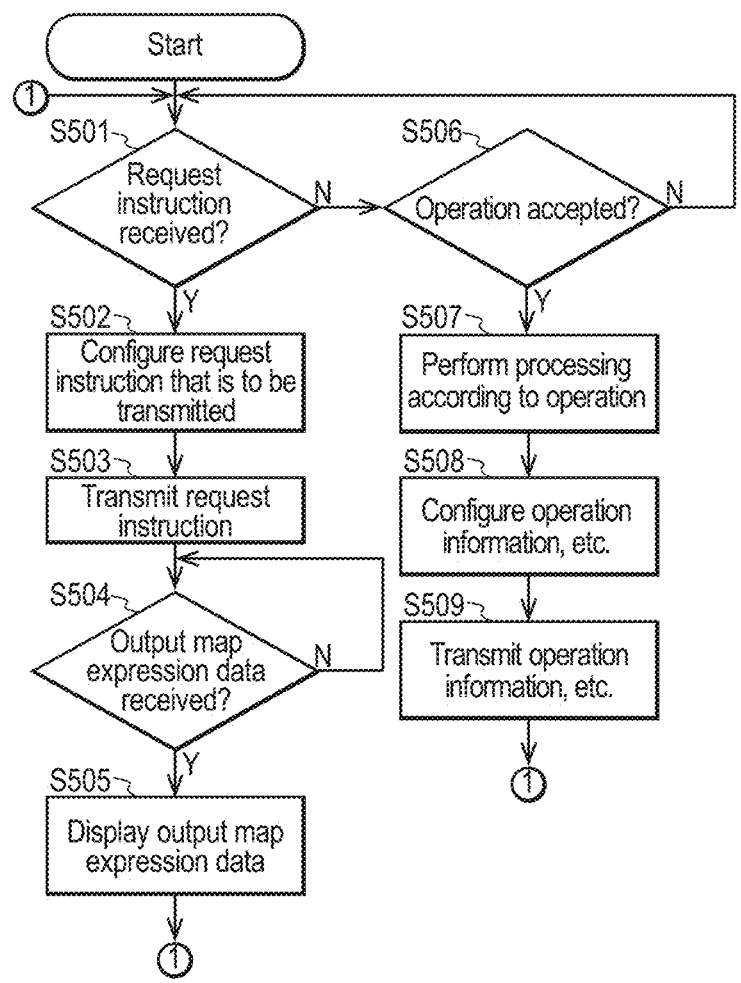
FIG. 5 is a flowchart illustrating an operation example of a terminal apparatus 2.
Figure 14:
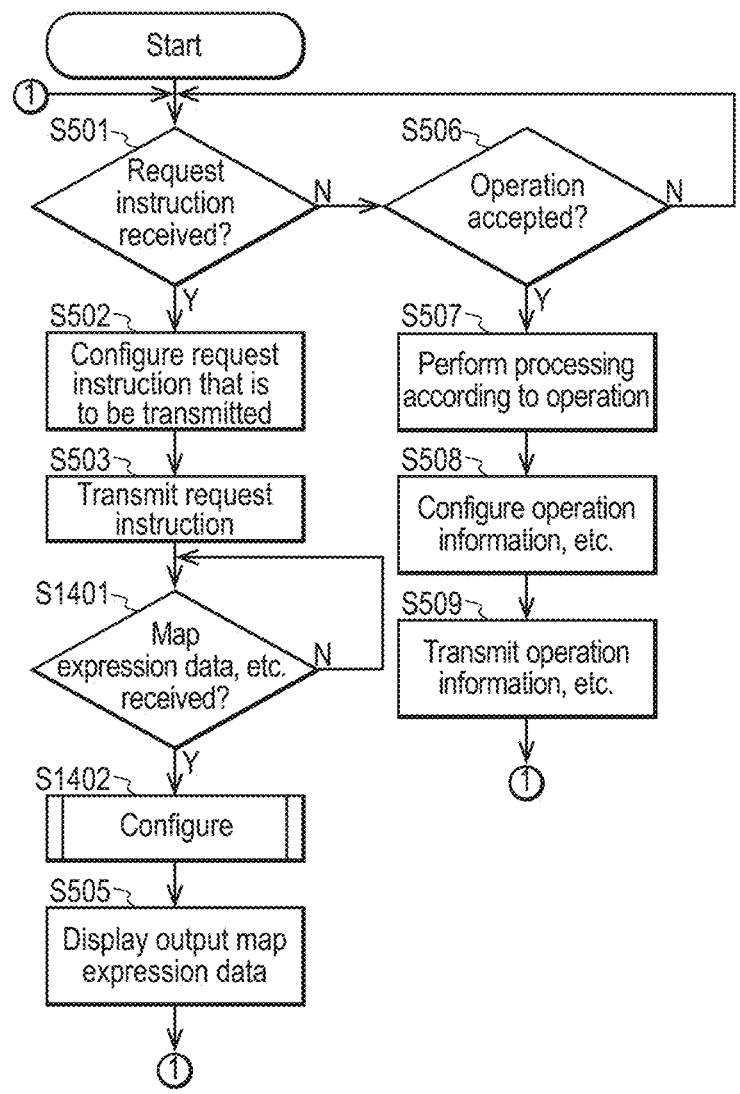
FIG. 14 is a flowchart illustrating an operation example of a terminal apparatus 4 in this embodiment.

In the flowchart in FIG. 14, a description of the steps similar to those in the flowchart in FIG. 5 has been omitted.

(Step S1401) The terminal receiving unit 45 judges whether or not it has received map expression data and the like. If it has received map expression data and the like, the procedure advances to step S1402, and, if otherwise, the procedure then returns to step S1401. The map expression data and the like are map expression data and one or more pieces of additional information.

(Step S1402) The terminal processing unit 43 configures output map expression data using the map expression data and the one or more pieces of additional information received in step S1401. The processing content of this configuring processing is similar to the processing described with reference to the flowchart in FIG. 4, and thus a detailed description thereof has been omitted.

As described above, according to this embodiment, it is possible to provide a user with map expression data whose display mode has been changed according to additional information.

Furthermore, according to this embodiment, it is possible to provide a user with map expression data in which, according to an advertisement fee, a display mode of a region specified with region specifying information that is paired with the advertisement information for specifying the advertisement fee is different from those of other regions.

Furthermore, according to this embodiment, it is possible to provide a user with map expression data in which, in a case in which a condition indicated by condition information corresponding to a region is satisfied, a display mode of the region specified with region specifying information that is paired with the condition information is different from those of other regions.

Furthermore, according to this embodiment, it is possible to provide a user with map expression data in which, in a case in which a date condition corresponding to a region is satisfied, a display mode of the region specified with region specifying information that is paired with the date condition is different from those of other regions.

Furthermore, according to this embodiment, it is possible to provide a user with map expression data that is different according to operation information.

The software that realizes the information processing apparatus 3 in this embodiment is, for example, the following sort of program. Specifically, this program is a program for causing a computer capable of accessing a storage medium including a map expression data storage unit in which one or more pieces of map expression data expressing a map are stored, the data being associated with one or more attribute values containing region specifying information for specifying a region that is being expressed, and an additional information storage unit in which additional information, which is information that is additional, is stored in association with the map expression data, to function as: a transmitting unit that transmits map expression data to a terminal apparatus such that even same map expression data is displayed on the terminal apparatus in a different mode according to the additional information.

Furthermore, in the foregoing embodiment, it is preferable that the program causes the computer to operate such that the transmitting unit transmits the map expression data and the additional information to the terminal apparatus.

The software that realizes the terminal apparatus 4 in this embodiment is, for example, the following sort of program. Specifically, this program is a program for causing a computer to function as: a terminal transmitting unit that transmits a request instruction; a terminal receiving unit that receives map expression data and one or more pieces of additional information from an information processing apparatus; a terminal processing unit that configures output map expression data using the map expression data and the one or more pieces of additional information received by the terminal receiving unit; and a terminal output unit that outputs the output map expression data. A detailed processing example of the terminal processing unit is as shown in FIG. 4.

Figure 15:
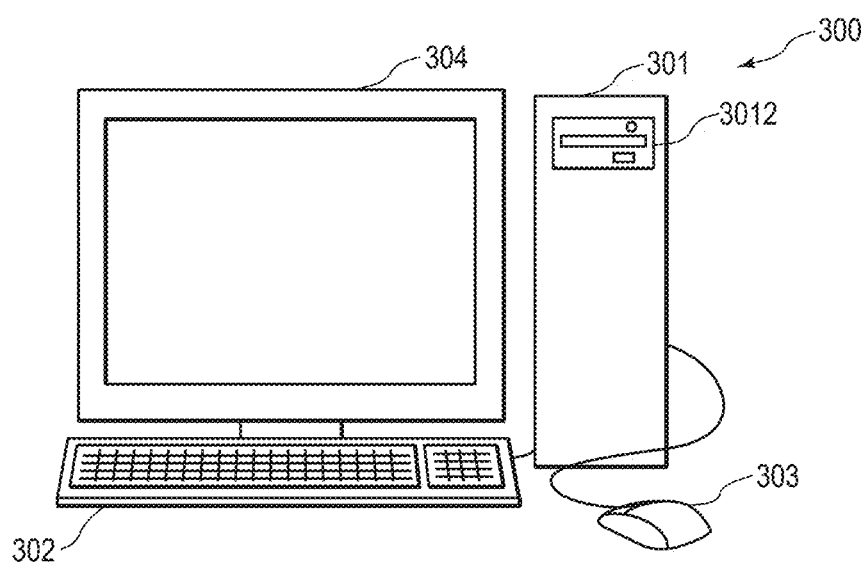
FIG. 15 is a schematic view of a computer system in the embodiments.
Figure 16:
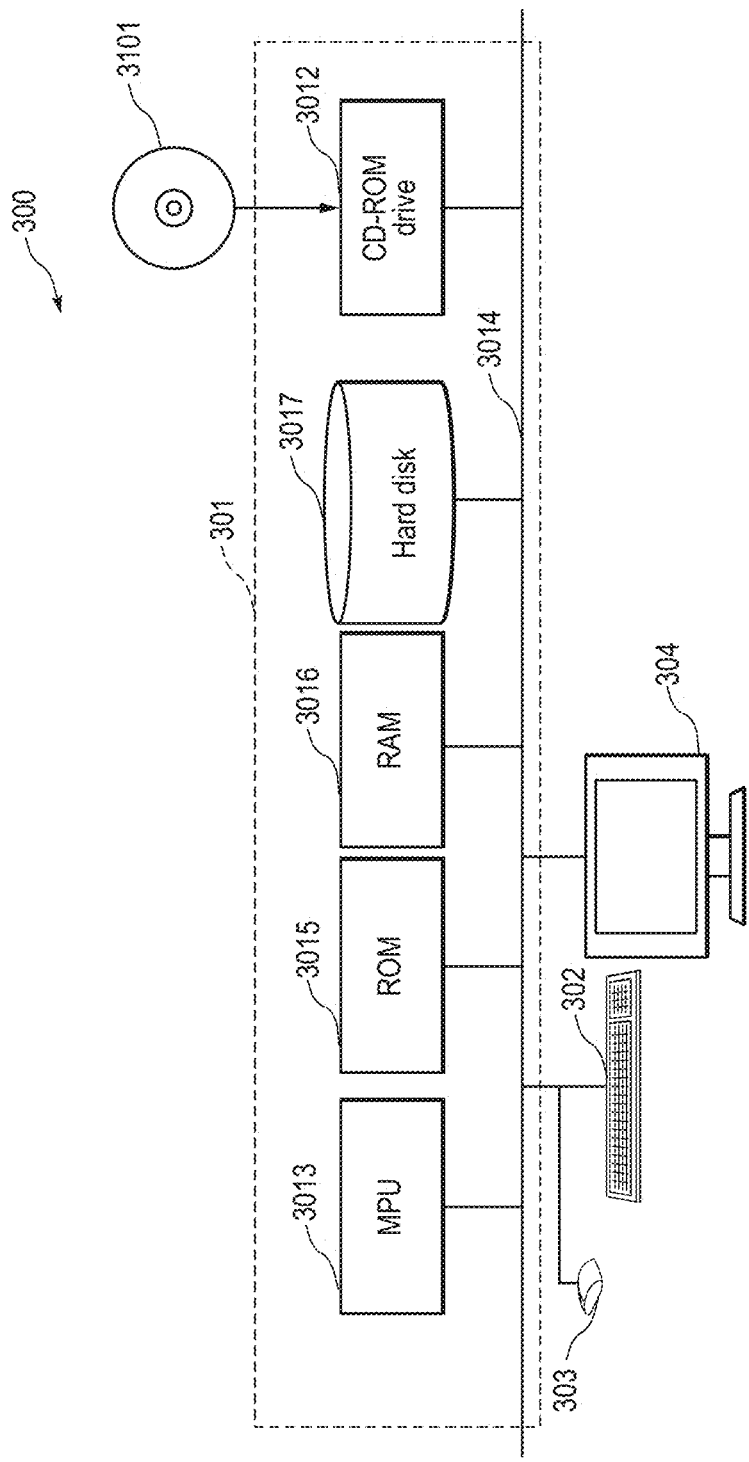
FIG. 16 is a block diagram of the computer system in the embodiments.

FIG. 15 shows the external appearance of a computer that executes the program described in this specification to realize the information processing apparatus and the like in the foregoing various embodiments. The foregoing embodiments may be realized using computer hardware and a computer program executed thereon. FIG. 15 is a schematic view of a computer system 300. FIG. 16 is a block diagram of the system 300.

In FIG. 15, the computer system 300 includes a computer 301 including a CD-ROM drive, a keyboard 302, a mouse 303, and a monitor 304.

In FIG. 16, the computer 301 includes, in addition to the CD-ROM drive 3012, an MPU 3013, a bus 3014 connected to the CD-ROM drive 3012 and the like, a ROM 3015 in which a program such as a boot up program is stored, a RAM 3016 that is connected to the MPU 3013 and is a memory in which a command of an application program is temporarily stored and a temporary storage area is provided, and a hard disk 3017 in which an application program, a system program, and data are stored. Although not shown, the computer 301 may further include a network card that provides connection to a LAN.

The program for causing the computer system 300 to execute the functions of the information processing apparatus 1 and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the information processing apparatus 1 and the like in the foregoing embodiments. The program may only include a command portion to call an appropriate function (module) in a controlled mode and obtain desired results. The manner in which the computer system 300 operates is well known, and thus a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes the program may be a single computer, or may be multiple computers. That is to say, centralized processing may be performed, or distributed processing may be performed.

Furthermore, in the foregoing embodiments, two or more communication parts in one apparatus may be physically realized by one medium.

In the foregoing embodiments, each process may be realized as centralized processing using a single apparatus, or may be realized as distributed processing using multiple apparatuses. That is to say, the information processing apparatus 1 may be a stand-alone apparatus.

The present invention is not limited to the embodiment set forth herein. Various modifications are possible within the scope of the present invention.

INDUSTRIAL APPLICABILITY

As described above, the information processing apparatus according to the present invention has the effect of making it possible to provide a user with map expression data whose display mode has been changed according to additional information, and thus this apparatus is useful as an information processing apparatus and the like.

LIST OF REFERENCE NUMERALS

1, 3 Information processing apparatus
2, 4 Terminal apparatus
11 Storage unit
11 Storage unit
12 Receiving unit
13, 33 Processing unit
14, 34 Transmitting unit
21 Terminal storage unit
22 Terminal accepting unit
23, 43 Terminal processing unit
24 Terminal transmitting unit
25, 45 Terminal receiving unit
26 Terminal output unit
111 Map expression data storage unit
112 Additional information storage unit
121 User position information receiving unit
121 Request instruction receiving unit
131 Configuring unit

The invention claimed is:

1. An information processing apparatus comprising:
   a map expression data storage in which one or more pieces of map expression data expressing a map are stored, the map expression data being associated with one or more attribute values containing region specifying information for specifying a region that is being expressed;
   an additional information storage in which additional information, which is information that is additional, is stored in association with the map expression data; and
   a transmitting unit that transmits map expression data to a terminal apparatus such that even same map expression data is displayed on the terminal apparatus in a different mode according to the additional information and the one or more attribute values, wherein:
   the one or more attribute values associated with the map expression data comprise at least one of a static attribute value or a dynamic attribute value,
   the static attribute value comprises at least one of an area of a region on the map indicated by the map expression data, a completion level of the map expression data, a theme of the map expression data, a type of the map expression data, or a keyword corresponding to the map expression data,
   the dynamic attribute value comprises at least one of a distance between a position indicated by position specifying information and a representative point of the map expression data, or user action information regarding an action of a user to the map expression data, and the user action information comprises at least one of a number of downloads, a number of views per month, an average access time or an evaluation value.

2. The information processing apparatus according to claim 1,
   wherein the additional information includes region specifying information for specifying at least a partial region in the map expression data corresponding thereto, and advertisement information regarding an advertisement that is to be displayed together with the map expression data on a terminal apparatus, and
   the transmitting unit transmits map expression data in which a display mode of a region specified with region specifying information that is paired with the advertisement information is different from those of other regions, according to the advertisement information, to a terminal apparatus.

3. The information processing apparatus according to claim 2, wherein:
   the advertisement information contains advertisement fee information for specifying an advertisement fee for a region specified with region specifying information that is paired with the advertisement information, and
   the transmitting unit transmits the map expression data such that a display mode of a region specified with the region specifying information that is paired with the advertisement fee information is different from those of other regions, according to the advertisement fee specified with the advertisement fee information.

4. The information processing apparatus according to claim 1, wherein:
   the additional information contains region specifying information for specifying a region in the map expression data, and condition information indicating a condition for the region specified with the region specifying information,
   the condition information includes a weather condition which is a condition regarding weather, and
   the transmitting unit transmits the map expression data such that, in a case in which a condition indicated by the condition information is satisfied, a display mode of a region specified with the region specifying information that is paired with the condition information is different from those of other regions.

5. The information processing apparatus according to claim 4, wherein the condition information contains date condition, which is a condition regarding a date.

6. The information processing apparatus according to claim 1, wherein:
   the additional information contains operation information regarding a user's operation on map expression data corresponding to the additional information on a terminal apparatus, and
   the transmitting unit transmits the map expression data such that even same map expression data is output in a different mode according to the operation information.

7. The information processing apparatus according to claim 1, wherein the map expression data is displayed in a different mode also according to a current position acquired by the terminal apparatus.

8. The information processing apparatus according to claim 1, further comprising
   a configuring unit that configures output map expression data that is map expression data that is to be output in a different mode according to the additional informa-tion, wherein the transmitting unit transmits the output map expression data to the terminal apparatus.

9. The information processing apparatus according to claim 1, wherein the transmitting unit transmits the map expression data and the additional information to the terminal apparatus.

10. The information processing apparatus according to claim 1, wherein the map expression data in the different mode is different in terms of any one or more of a scale of the data displayed on the terminal apparatus, a region displayed on the terminal apparatus, and an orientation of the data displayed on the terminal apparatus.

11. The information processing apparatus according to claim 1, wherein the map expression data in the different mode is map expression data in which an image of a partial region thereof has a different attribute value.

12. An information processing method realized using a map expression data storage in which one or more pieces of map expression data expressing a map are stored, the data being associated with one or more attribute values containing region specifying information for specifying a region that is being expressed, and an additional information storage in which additional information, which is information that is additional, is stored in association with the map expression data, the method comprising:
    transmitting map expression data to a terminal apparatus such that even same map expression data is displayed on the terminal apparatus in a different mode according to the additional information and the one or more attribute values, wherein:
    the one or more attribute values associated with the map expression data comprise at least one of a static attribute value or a dynamic attribute value,
    the static attribute value comprises at least one of an area of a region on the map indicated by the map expression data, a completion level of the map expression data, a theme of the map expression data, a type of the map expression data, or a keyword corresponding to the map expression data,
    the dynamic attribute value comprises at least one of
    a distance between a position indicated by position specifying information and a representative point of the map expression data, or user action information regarding an action of a user to the map expression data, and
the user action information comprises at least one of a number of downloads, a number of views per month, an average access time or an evaluation value.

13. A non-transitory computer readable medium storing a program for causing a computer capable of accessing a storage medium including a map expression data storage in which one or more pieces of map expression data expressing a map are stored, the data being associated with one or more attribute values containing region specifying information for specifying a region that is being expressed, and an additional information storage in which additional information, which is information that is additional, is stored in association with the map expression data, to perform:
    transmitting map expression data to a terminal apparatus such that even same map expression data is displayed on the terminal apparatus in a different mode according to the additional information and the one or more attribute values, wherein:
    the one or more attribute values associated with the map expression data comprise at least one of a static attribute value or a dynamic attribute value,
    the static attribute value comprises at least one of an area of a region on the map indicated by the map expression data, a completion level of the map expression data, a theme of the map expression data, a type of the map expression data, or a keyword corresponding to the map expression data,
    the dynamic attribute value comprises at least one of
    a distance between a position indicated by position specifying information and a representative point of the map expression data, or user action information regarding an action of a user to the map expression data, and
the user action information comprises at least one of a number of downloads, a number of views per month, an average access time or an evaluation value.

\* \* \* \* \*